(12) United States Patent
Zhang et al.

(10) Patent No.: US 8,679,679 B2
(45) Date of Patent: Mar. 25, 2014

(54) SILICON BASED COMPOSITE MATERIAL

(75) Inventors: Pu Zhang, Ann Arbor, MI (US); Suresh Mani, Ann Arbor, MI (US); Junqing Ma, Ann Arbor, MI (US); Liya Wang, Ann Arbor, MI (US); Jun Q. Chin, Waterford, MI (US)

(73) Assignee: A123 Systems, Inc., Waltham, MA (US)

( * ) Notice: Subject to any disclaimer, the term of this patent is extended or adjusted under 35 U.S.C. 154(b) by 618 days.

(21) Appl. No.: 12/350,631

(22) Filed: Jan. 8, 2009

(65) Prior Publication Data

US 2009/0179181 A1 Jul. 16, 2009

Related U.S. Application Data

(60) Provisional application No. 61/020,525, filed on Jan. 11, 2008.

(51) Int. Cl.
*H01M 4/134* (2010.01)

(52) U.S. Cl.
USPC ............ 429/218.1; 429/209; 252/182.1; 252/502; 252/504; 252/521.3

(58) Field of Classification Search
USPC ............ 252/502, 504, 521.3, 182.1; 429/209, 429/218.1
See application file for complete search history.

(56) References Cited

U.S. PATENT DOCUMENTS

| | | | | |
|---|---|---|---|---|
| 5,939,224 A | * | 8/1999 | Bito et al. | 429/220 |
| 6,235,427 B1 | * | 5/2001 | Idota et al. | 429/218.1 |
| 7,316,792 B2 | | 1/2008 | Kosuzu et al. | |
| 2004/0247872 A1 | * | 12/2004 | Sudo et al. | 428/402.24 |
| 2005/0282070 A1 | | 12/2005 | Doh et al. | |
| 2006/0059771 A1 | | 3/2006 | Malfer et al. | |
| 2007/0077490 A1 | | 4/2007 | Kim et al. | |
| 2007/0190413 A1 | | 8/2007 | Lee et al. | |

FOREIGN PATENT DOCUMENTS

| | | |
|---|---|---|
| JP | 2001250542 A | 9/2001 |
| WO | WO-2007015910 A1 | 2/2007 |

* cited by examiner

*Primary Examiner* — Mark Kopec
*Assistant Examiner* — Haidung Nguyen
(74) *Attorney, Agent, or Firm* — Gifford, Krass, Sprinkle, Anderson & Citkowski, P.C.

(57) ABSTRACT

A composite material having utility as an anode for lithium ion batteries comprises silicon, a transition metal, a ceramic and an electrically conductive diluent such as carbon. In particular instances, the ceramic is electrically conductive, and may comprise vanadium carbide or tungsten carbide. The transition metal may, in some instances, comprise iron. The material may be fabricated by grinding together a starting mixture of the components, and grinding may be accomplished in a high impact ball milling process, and the grinding step may cause partial alloying of the silicon with the metal and/or carbon. Further disclosed is a method for making the material as well as electrodes which incorporate the material.

14 Claims, 2 Drawing Sheets

SILICON BASED COMPOSITE MATERIAL

CROSS-REFERENCE TO RELATED APPLICATIONS

This application claims priority of U.S. Provisional Patent Application Ser. No. 61/020,525 filed Jan. 11, 2008, entitled "Silicon Based Composite Material", the disclosure of which is incorporated herein by reference.

FIELD OF THE INVENTION

This invention relates generally to materials and methods for their fabrication. In particular, the invention relates to silicon based composite materials having utility as components of electrodes for electrochemical devices such as lithium batteries.

BACKGROUND OF THE INVENTION

In the operation of a lithium ion battery, the anode takes up lithium ions from the cathode when the battery is being charged and releases those ions back to the cathode when the battery is being discharged. One important parameter of the anode material is its capacity for retaining lithium ions, since this will directly impact the amount of charge which a given battery system can retain. Another important parameter is reversibility, that is to say the number of times the material can take up and release lithium ions without degradation or significant loss of capacity. This parameter will directly influence the service life of the battery system.

Current lithium ion battery systems generally employ a carbonaceous anode due to the fact that it has very high reversibility and is very safe. One problem with carbon materials is that their lithium ion capacity is only moderately high; hence, relatively large amounts of anode material must be employed in a given battery system. Silicon is capable of alloying with relatively large amounts of lithium and hence has a number of advantages as an anode material for lithium ion batteries. Typical carbon based anodes have discharge capacities of approximately 372 mAh/g while silicon has a theoretical capacity of 4200 mAh/g. However, silicon undergoes a relatively large volume change when lithium is incorporated therein and this volume change is very disadvantageous in most battery systems, since it can cause a loss of capacity, decrease cycle life, and cause mechanical damage to the battery structure.

Because of silicon's potential advantages as an anode in a lithium ion battery system, the prior art has made attempts to overcome problems of mechanical damage and reversibility so as to allow it to be used in battery systems. Toward that end, the prior art has sought to utilize alloys, composites, and other complex structures of silicon and other materials in anodes of lithium ion batteries. Some such approaches are disclosed in U.S. Patent Application Publications 2007/0077490, 2007/0190413 and 2005/0282070; U.S. Pat. No. 7,316,792; and published PCT Application WO 2007/015910.

Despite the various efforts, the prior art has not been able to successfully utilize silicon based materials to prepare high capacity anode structures for lithium ion batteries which manifest high cycle lives. As will be explained in detail hereinbelow, the present invention provides a composite, silicon based electrode material which is capable of alloying with large amounts of lithium ions and which retains this ability through a large number of charge/discharge cycles. The anode materials of the present invention allow for the manufacture of high capacity lithium ion batteries which have very good cycle life. These and other advantages of the present invention will be apparent from the drawings, description and discussion which follow.

BRIEF DESCRIPTION OF THE INVENTION

Disclosed herein is a composite material which may be utilized as an electrode for a lithium ion battery or other electrochemical device. The material is comprised of silicon, a transition metal, a ceramic, and an electrically conductive diluent such as carbon. In particular instances, the material comprises, on a weight basis, 5-85% silicon, 1-50% of the transition metal, 1-50% of the ceramic and 1-80% of the diluent. The transition metal may, in some instances, comprise iron, while in other instances the transition metal may comprise a mixture of transition metals. The ceramic material may, in some instances, comprise a nitride, carbide, oxide, oxynitride, oxycarbide, or a combination of the foregoing. In specific instances the ceramic is electrically conductive, and in particular instances the ceramic is VC or WC. The diluent may comprise carbon, and in particular instances comprises mesocarbon microbeads. In some instances, the silicon is at least partially alloyed with the transition metal and/or the carbon. In other instances, the composite material may further include tin.

One particular composite material of the present invention comprises, on a weight basis, 20% silicon, 20% iron, 10% VC and the remainder carbon.

Also disclosed is a method for the manufacture of the composite material wherein a starting mixture comprising, on a weight basis, 5-85% silicon, 1-50% of the transition metal, 1-50% of a ceramic and 1-80% of carbon is ground together In specific instances, the grinding is carried out by ball milling. In a particular process, the grinding is carried out in a high impact ball milling process under conditions such that at least a portion of the silicon is alloyed with the transition metal and/or the carbon.

Further disclosed are electrodes which incorporate the composite material as well as lithium ion batteries which incorporate those electrodes.

DETAILED DESCRIPTION OF THE INVENTION

Figure 1:
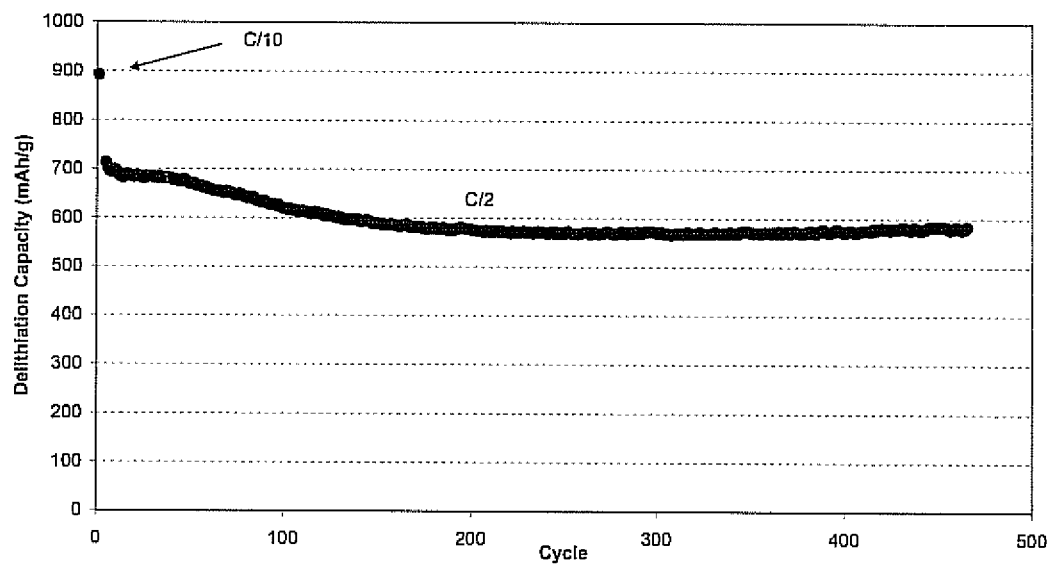
FIG. 1 is a graph of delithiation capacity, in terms of mAh/g, versus the number of charge-discharge cycles for a first battery system incorporating the anode material of the present invention.

The composite material of the present invention includes silicon and one or more transition metals, together with a rigid, inert material such as a ceramic. In the context of this disclosure, an inert material is understood to be a material which does not participate in the lithium ion battery reaction insofar as it does not take up or release lithium ions. While silicon can alloy with large amounts of lithium, it has been found that when it does so, volume changes of up to 350% can occur. However, the composite materials of the present invention exhibit good mechanical and dimensional stability when lithium ions are taken up and released during the operation of a battery system. It is believed that some of the stability comes from combining the silicon with the transition metal; however, further stability is achieved by the inclusion of the rigid, inert material. While not wishing to be bound by speculation, applicant believes that this material may exert an effect during the preparation of the composite wherein it acts as a micro-grinding agent which is operative to ensure optimum interaction between the silicon and metal components. It is also believed that during the cycling of the composite, the rigid, inert material acts to control the morphology of the particles of the composite. Again, in that regard it may act as an internal grinding agent to reduce undesired particulates or otherwise control the morphology of the material. The rigid, inert material is in most instances a ceramic, and in particular instances is an electrically conductive ceramic such as VC or WC, and it is believed that this additional electrical conductivity further enhances the efficiency of the composite.

As discussed above, the composite may also include a diluent material. This diluent is an electrically conductive material and may also be electrochemically active. In that regard, one specifically employed diluent material is carbon. The carbon may comprise any type of carbon black. One type of carbon which has been employed in the present invention is in the form of mesocarbon microbeads, and one particular grade of such material is available from Osaka Gas Co. under the designation MCMB.

A typical material of the present invention comprises, on a weight basis, 5-85% of silicon and 1-50% of the transition metal. The metal component may comprise one or more transition metals, and in one particular instance, the transition metal is iron. The rigid, inert material comprises 1-50% of the composite, and as noted above, this material is generally a ceramic and as such is one or more of: nitrides, carbides, oxides, oxynitrides, or oxycarbides of a metal. A specific ceramic having utility in the present invention is vanadium carbide (VC) or, alternatively, tungsten carbide (WC). The remainder of the composite will be comprised of carbon or another electrically conductive diluent, and as such, this component is typically present in a weight percentage of 1-80%. In some specific instances, the silicon and metal component are present in roughly equal amounts, and in particular formulations, the composite comprises, by weight, 20% of silicon, 20% of iron, 10% of vanadium (or tungsten) carbide, with the remainder being carbon.

The materials of the present invention are prepared by grinding the components together. Typically, the composite material will have a particle size in the range of 10 nanometers to 50 microns, and in general, the finished materials of the present invention have a particle size in the range of 10-20 microns. It is generally desirable that the silicon component be nanodispersed throughout the composite; and in that regard, it is generally preferred that the silicon component initially disposed in the starting mixture have a relatively small particle size. In some embodiments, materials of the present invention have been prepared utilizing a starting mixture in which the particle size of the silicon is in the range of 50-100 nanometers. In other instances, larger particle sizes of silicon such as 325 mesh silicon have been employed; however, in such instances, the silicon is either preground to a smaller particle size or the total grinding time in the process is adjusted accordingly.

The grinding is typically carried out by a ball milling process, and in some cases, it has been found advantageous to utilize a high impact ball milling process. Details of high impact ball milling processes are well known to those of skill in the art and such techniques may be readily adapted to the practice of the present invention. It has been found that when a high impact ball milling process is utilized, under some conditions the silicon and metal components interact so as to at least partially alloy, and formation of the alloy material has been confirmed by x-ray diffraction analysis.

EXPERIMENTAL

A composite material was fabricated in accord with the present invention by combining, on a weight basis, 20% of silicon powder having a nominal particle size of 50 nanometers; 20% by weight of iron powder, 325 mesh; 50% mesoporous carbon microbeads MCMB628; and 10% VC, 325 mesh. This starting mixture was subjected to a high impact ball milling process in dry power form by using 8000M mill from SPEX SamplePrep Group for a period of 0.5-20 hours. The ball milling process caused at least partial alloying of the silicon with the iron and carbon, under some conditions, as was evidenced by x-ray diffraction analysis.

The thus prepared composite material was formed into electrodes by casting the electrode slurry onto Cu foil. The slurry comprises 70-95% of Si composite material, 2-15% carbon black or other additive, 2-20% binder, and balanced solvent. The electrode was dried at elevated temperature, sometimes with under vacuum. The thus prepared electrodes were then incorporated into test cells. In a first series of tests, half cells were prepared in which the electrode loading was 0.8 mg/cm$^2$ and these cells used an electrolyte comprising 1 molar LiPF$_6$ in a 1:1:1 mixture of EC:DMC:DEC. These half cells were cycled over a voltage range of 2.2-0.1 volts and the charge storage capacity in terms of mAh/g was plotted against cycle members. The data from this experimental series is summarized in FIG. 1; it will be seen that cells incorporating this material exhibit very good stability for over 450 cycles.

Figure 2:
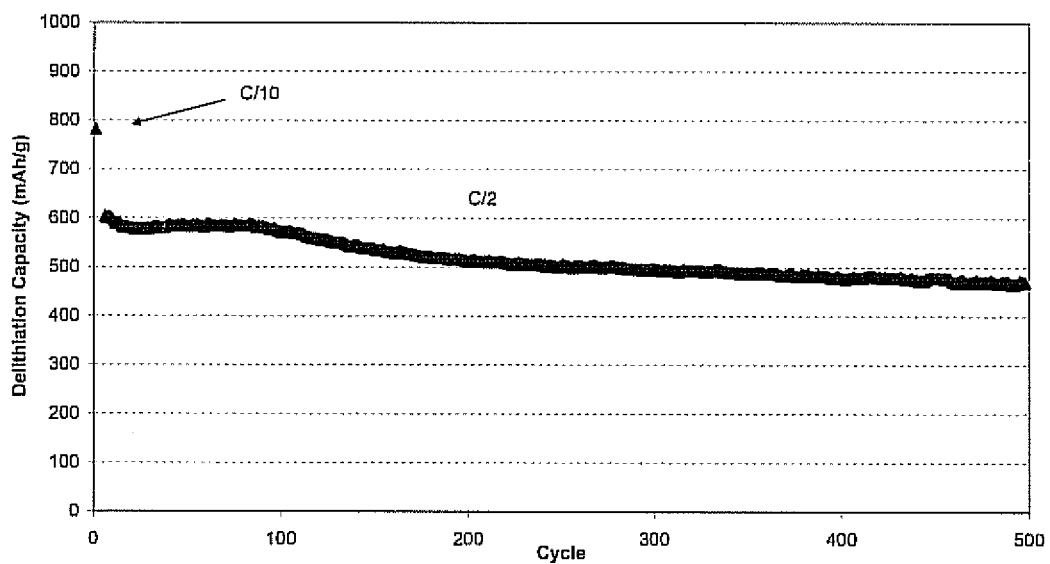
FIG. 2 is a graph of delithiation capacity, in terms of mAh/g, versus the number of charge-discharge cycles for a second battery system incorporating the anode material of the present invention.

In a second experimental series, the composite material was fabricated into anodes at a loading of approximately 1.1 mg/cm$^2$. The electrolyte utilized in these cells was 1 molar LiPF$_6$ in 1:1:1 EC:DMC:DEC having a fluorocarbon additive added thereto. These cells were then cycled over a voltage range of 2.2-0.1 volts and the charge storage capacity in terms of mAh/g is shown in FIG. 2 as a function of charge/discharge cycles. It will be seen from FIG. 2 that these electrodes demonstrated very good cycle life for at least 500 charge/discharge cycles.

Similar results are anticipated utilizing composite materials wherein the metal component comprises another transition metal such as cobalt, nickel, copper, manganese, chromium or vanadium. Likewise, there are a large variety of ceramics which may be employed in the present invention; and as noted above, such ceramics can include nitrides, carbides, oxynitrides and oxycarbides of various metals.

In view of the foregoing, numerous modifications and variations of this invention will be apparent to those of skill in the art. The foregoing discussion, description and examples are meant to be illustrative of the present invention, but are not meant to be limitations upon the practice thereof. It is the following claims, including all equivalents, which define the scope of the invention.

The invention claimed is:

1. A composite material having utility in an electrode for an electrochemical device, said material comprising:
   silicon;
   a transition metal;
   a ceramic selected from the group consisting of: vanadium carbide, tungsten carbide, and combinations thereof; and
   an electrically conductive diluent.

2. The material of claim 1, comprising, on a weight basis, 5-85% silicon, 1-50% of said transition metal, 1-50% of said ceramic, and 1-80% of said diluent.

3. The material of claim 1, wherein said transition metal comprises iron, cobalt, nickel, copper, manganese, chromium or vanadium.

4. The material of claim 1, wherein said ceramic is electrically conductive.

5. The material of claim 1, wherein said diluent comprises carbon.

6. The material of claim 1, wherein said diluent comprises mesocarbon microbeads.

7. The material of claim 1, wherein said silicon and said transition metal are present in an approximately equal weight basis.

8. The material of claim 1, wherein said silicon and said transition metal are at least partially alloyed.

9. The material of claim 1, wherein said transition metal component comprises at least two different transition metals.

10. The material of claim 1, wherein said material has a particle size in the range of 10 nanometers-50 micrometers.

11. A composite material comprising, on a weight basis, 20% silicon, 20% iron, 10% vanadium carbide, and the remainder, carbon.

12. A composite material comprising, on a weight basis, 20% silicon, 20% iron, 10% tungsten carbide, and the remainder, carbon.

13. An electrode which includes the composite material of claim 1.

14. A composite material having utility in an electrode for an electrochemical device, said material consisting essentially of:
 silicon;
 a transition metal;
 a ceramic selected from the group consisting of: vanadium carbide, tungsten carbide, and combinations thereof; and
 an electrically conductive diluent.

* * * * *